Nov. 29, 1960  W. E. LAUTERBACH  2,962,049
THERMAL TIMER

Filed Dec. 12, 1955  3 Sheets-Sheet 1

INVENTOR
WILLIAM E. LAUTERBACH

BY *[signature]* ATTORNEYS

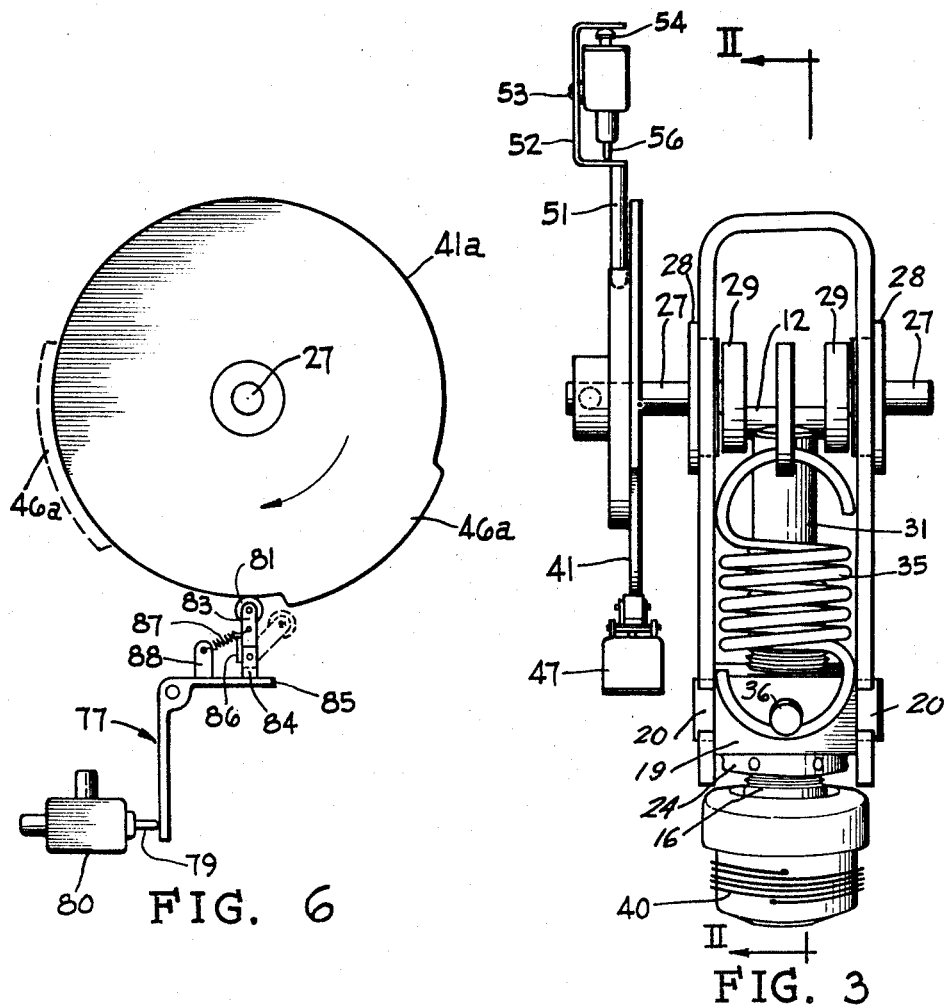

Nov. 29, 1960 W. E. LAUTERBACH 2,962,049
THERMAL TIMER
Filed Dec. 12, 1955 3 Sheets-Sheet 3

INVENTOR
WILLIAM E. LAUTERBACH

United States Patent Office 2,962,049
Patented Nov. 29, 1960

2,962,049
THERMAL TIMER

William E. Lauterbach, Chicago, Ill., assignor to The Dole Valve Company, Chicago, Ill., a corporation of Illinois Filed Dec. 12, 1955, Ser. No. 552,379

2 Claims. (Cl. 137—624.13)

This invention relates to improvements in timers and more particularly relates to a thermal timer in which time is measured by the cooling cycle of a thermal element.

A principal object of the invention is to provide a timer operating on the principle that for a given ambient temperature the time for the power member of a thermal element to travel its return stroke during cooling of the thermal element is relatively constant.

Another object of the invention is to provide a timer in which a thermal element is heated and allowed to cool and in which timing is controlled by the cooling cycle of the thermal element.

Still another object of the invention is to provide a timer in the form of a heat motor performing work during heating of the motor and effecting a constant time control during cooling thereof.

A still further object of the invention is to provide a time controlled device for effecting a filling operation in a predetermined time interval and determined by the cooling cycle of an electrically heated thermal element.

A still further object of the invention is to provide a fluid metering device for supplying a measured volume of fluid, in which the fluid is measured by the time required for the power member of a thermal element to travel a portion of its return stroke.

A still further object of the invention is to provide a novel and simplified form of metering device to be contained within a household refrigerator for sequentially filling ice cube tray with the metered volume of water, in which the metering operation is timed by the cooling cycle of a thermal element.

A still further object of the invention is to provide a novel and simplified form of metering device for use in metering uniform volumes of fluids, such as water and the like, in which an electrically energizable heat motor serves to perform a power operation during heating thereof and times operation of the metering device during cooling thereof, to effect the delivery of a measured volume of fluid in accordance with the cooling cycle of the heat motor.

A still further object of the invention is to provide a novel and simplified form of apparatus to be contained within a household refrigerator for metering measured volumes of fluid and supplying the same to the ice cube tray of an automatic ice maker, in which a power type of thermal element is heated by electrically energizable means and during the heating operation serves to perform a work operation, such as the ejection of ice cubes from an ice cube tray, and is allowed to cool at the termination of the heating operation and measures the filling of the tray in accordance with the cooling cycle of the thermal element.

These and other objects of the invention will appear from time to time as the following specification proceeds and with reference to the accompanying drawings wherein:

Figure 3 is an end view of the device shown in Figure 1;

Figure 6 is a fragmentary view illustrating a modified form of my invention in which a valve is directly operated by a timer cam operated by a heat motor.

Figure 1:
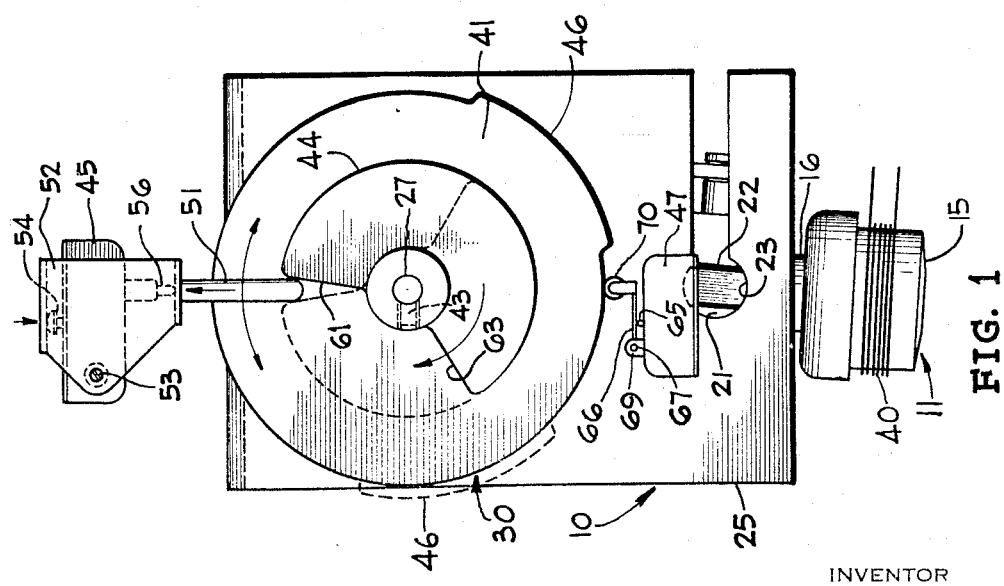
Figure 1 is a view in side elevation of a timer constructed in accordance with the invention.

In the embodiment of the invention illustrated in the drawings, I have shown in Figure 1 a heat motor including a housing 10 forming a rocking support for a thermal element 11 and a bearing support for a crankshaft 12 operated by said thermal element and converting the rectilinear motion of a piston 13 of said thermal element into rotary motion.

The thermal element 11 is herein shown as being a power or solid fill type of thermal element, although it need not be such a thermal element and may be a bellows type of thermal element or any other type of thermal element having a long enough stroke and sufficient power to perform the necessary work required to effect the timing operation.

The thermal element 11 is herein shown as being of a type similar to that shown and described in the Vernet Patent No. 2,368,181, dated January 30, 1945. In such types of thermal elements, a thermal medium (not shown) in the form of a fusible thermally expansible material is contained within a casing 15 and reacts against a membrane or deformable member (not shown) to extend the power member or piston 13 with respect to a cylinder 16 extending from the casing 15, as the fusible thermally expansible material reaches its fusion point. The fusible thermally expansible material may be a wax alone or a wax containing a powdered metal conductor and a binder, the material used being selected for its melting or fusion point, and the fusion point thereof determining the temperature range of operation of the thermal element.

The cylinder 16 of the thermal element 11 is shown as being relatively long to form a slidable guide for the piston 13, and as being threaded throughout its length to accommodate adjustment of travel of the crankshaft 12. As herein shown, the cylinder 16 is threaded within a collar or spider 19 having trunnion pins 20 extending from opposite sides thereof and having rocking engagement with the arcuate surfaces of keyhole slots 21 formed in side walls 25 of the housing 10 and opening toward one side of said housing. The trunnion pins 20 have opposite flat sides 22 extending parallel with respect to each other and terminating into arcuate bearing surfaces 23 having bearing engagement with the arcuate portions of the keyhole slots 21. The trunnion pins 20 may be inserted in the keyhole slots 21 with the flattened portions thereof movable along the rectilinear portions of the said slots. The collar 19 may then be turned as the trunnion pins register with the arcuate portions of the keyhole slots 21 to bring the arcuate surfaces of said trunnion pins into bearing engagement therewith. A nut 24 is threaded on the cylinder for engagement with the collar 19, when the thermal element has been properly adjusted with respect to said collar to lock said thermal element for movement with respect to said collar.

The crankshaft 12 is secured at its ends to disks 29 eccentric of the center of said disks. Shafts 27 are secured to said disks concentric with the centers thereof and extend outwardly therefrom and are journaled in the side walls 25 on bearing inserts 28 recessed within said side walls. One shaft 27 is shown as forming a drive shaft for driving a timer cam 30. The other shaft 27 may drive an ice cube ejector, (not shown) or any other mechanism to be driven and particularly such a mechanism as requires an initial high starting torque.

Figure 2:
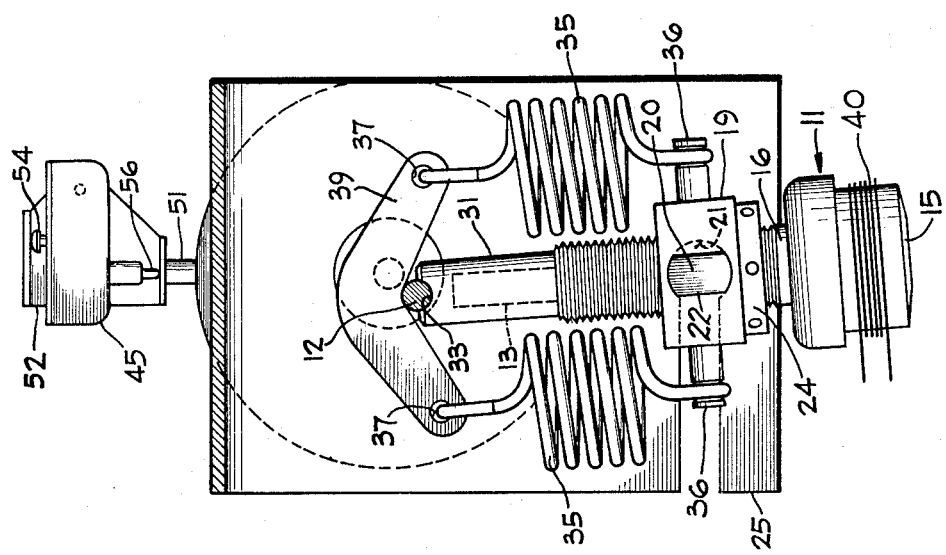
Figure 2 is a view somewhat similar to Figure 1 but showing the timer from the opposite side thereof from the view in Figure 1, and showing the casing for the timer in vertical section, taken substantially along line II—II of Figure 3.

The piston 13 is shown in Figure 2 as extending within a plunger or extension 31 having an arcuate recess 33 formed in its outer end and forming a saddle engageable with the crank 12, to effect the rocking movement of said crank upon extensible movement of the piston 13 with respect to the cylinder 16.

The piston 13 is retractibly moved with respect to its cylinder 16 by means of two return springs 35 connected at their lower ends to aligned pins 36 extending outwardly from the collar 19 in opposite directions. The springs 35 are connected at their opposite ends through apertures 37 extending through the end portions of a generally V-shaped yoke 39, riding on the crankshaft 12.

The casing 15 of the heat motor 11 is shown as being encircled by a resistor coil 40 which may be energized under thermostatic control, as will hereinafter more clearly appear as this specification proceeds, to heat the thermally responsive material contained within the casing 15 and effect extensible movement of the piston 13 with respect to the cylinder 16 and rotatable movement of the shaft 27 for the full extent of extensible movement of the piston 13 with respect to the cylinder 16. Return movement of the piston 13 and crank 12, upon cooling of the thermal element, is effected by the springs 35 and yoke 39, in an obvious manner.

Referring now in particular to Figures 1 and 3 of the drawings, the cam 30 is secured to the associated shaft 27 by a set screw 43 of like securing device. The cam 30 is shown as including cams 41 and 44 arranged in side by side relation with respect to each other. The cam 44 is to the outside of the cam 41 and is of a reduced diameter from the diameter of the cam 41 and serves to operate a cycle switch 45 to energize or deenergize the resistor 40, as will hereinafter more clearly appear as this specification proceeds.

Figure 4:
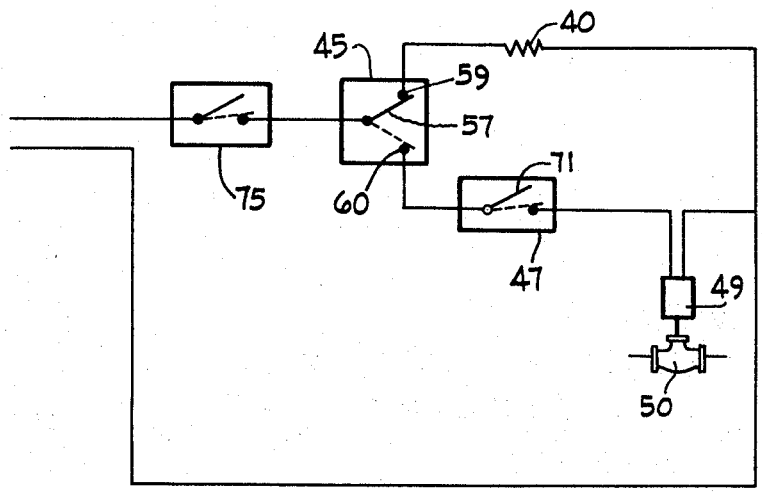
Figure 4 is a diagrammatic view diagrammatically showing the electric circuit controlling energization of the heat motor and the operation of the filler valve.

The cam 41 has a lobe 46 extending from the periphery thereof to operate a switch 47 to control the energization of a solenoid 49 for actuating a valve 50 (see Figure 4). The valve 50 is provided to supply a measured volume of fluid to a container (not shown), to fill the same to a predetermined level in a definite time interval. The valve 50 may be a constant flow valve arranged to provide a constant volume of water regardless of pressure variations at the source. Such valves usually have a flow control member (not shown) either at the inlet or outlet of the valve, which is deformable in accordance with pressure variations to maintain the delivery volume of fluid substantially constant for a predetermined time interval.

The cycle switch 45 may be suitably mounted on the housing 10 or may be mounted in fixed relation with respect to said housing and is shown as having a pivoted actuating arm 51 depending from a yoke 52 pivoted to the body of the switch 45 on a pivot pin 53. The yoke 52 extends inwardly of the body of the switch in vertically spaced relation with respect thereto for engagement with a depressible switch button 54 extending upwardly from the body of the switch and a depressible button 56 extending downwardly from the body of the switch.

The cycle switch 45 is diagrammatically shown in Figure 4 as being a two-way switch having a movable switch arm 57 actuated by depression of the button 56 into a position to engage a stationary contact 59, as shown by solid lines in Figure 4, to complete a circuit to the resistor or heater coil 40 to heat the thermal element 11 to effect the power stroke thereof. The switch 45 is of such a type that upon depression of the button 56 the switch arm 57 will stay in the position shown in Figure 4 until depression of the button 54, which will move the switch arm 57 to the dotted line position shown in Figure 4 into engagement with a stationary contact 60, completing an energizing circuit to the valve switch 47.

The switch actuating arm 51 extends into position to be engaged by either end 61 or 63 of the cam 44. Thus, upon movement of the cam 44 in a counterclockwise direction from the dotted line position shown in Figure 1 into engagement with the actuating arm 51, said arm and the yoke 52 will pivot to depress the push button 54 to move the switch arm 57 to the dotted line position shown in Figure 4. This will complete an energizing circuit to the valve switch 47. Upon rotation of the cam 44 in an opposite direction and engagement of an opposite face 63 of the cam 44 with the actuating arm 51, said actuating arm 51 will be rocked in an opposite direction to depress the button 56 and move the switch arm 57 to the solid line position shown in Figure 4 to provide an energizing circuit to the resistor heater 40.

The valve switch 47 may be a well known form of limit switch having a depressible switch button 65 engaged by a pivoted arm 66 pivoted on a pivot pin 67 to a bracket 69 extending from the casing of the switch. The arm 66 is shown as having a roller 70 on its free end engaged by the lobe 46 of the cam 41 to depress the switch button 65.

The switch 47 may be a well known form of limit switch so constructed and arranged that when the cam 41 is rotating in a counterclockwise direction, the switch button 65 will be depressed but will have no effect, since cycle switch 45 will be open with respect to switch 47. When the cam 41 and lobe 46 are moving in a clockwise direction and the lobe 46 comes into engagement with the button 65, the contact arm 71 of the switch 47 will move to the dotted line position shown in Figure 4 into position to energize the coil of the solenoid 49 for operating the valve 50, cycle switch 45 being closed with respect to switch 47.

Figure 5:
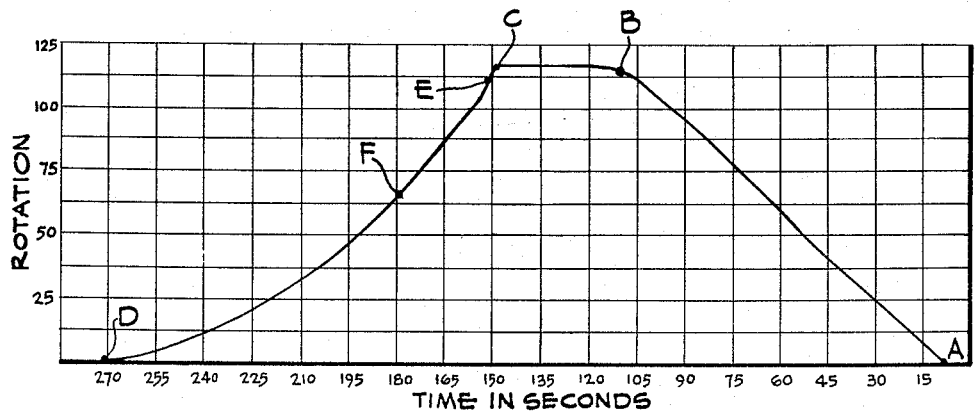
Figure 5 is a graph of time against motion and illustrating the curve of the heat motor during its power and return strokes.

In operation of the device illustrated in Figures 1 through 4, and assuming the heat motor is to be utilized to eject ice cubes from an ice cube tray of an ice maker, as in an application filed by Edward E. Modes and Nicholas Miller on July 18, 1955, Serial No. 522,526, now Patent No. 2,912,835, and entitled "Rotary Ice Cube Ejecting Mechanism," the temperature of the frozen water may be sensed by a temperature sensitive switch 75 which closes when the temperature of the frozen water reaches a temperature which may be in the neighborhood of 26° F. At this time the cam 44 will be in the dotted line position shown in Figure 1 and the switch button 56 will be depressed, with the movable switch arm 57 in engagement with the stationary contact 59. The resistor heater 40 will then be energized through the cycle switch 45. This will effect heating of the thermal element 11 and the power stroke of the piston 13 to drive the crankshaft 12 in a direction, which in Figure 1 is shown as being a counterclockwise direction, to perform the work of ejecting ice cubes during extensible movement of the piston 13 from the cylinder 16. The heat motor during its power stroke will move from point "A" to the point "B" in the graph in Figure 5, each space between the vertical ordinants in this graph representing a time interval of 15 seconds. At point "B" the cam 44 will have moved to the solid line position shown in Figure 1. The actuating arm 51 and yoke 52 will then have been moved by said cam into position to depress the push button 54 and move the movable switch arm 57 to the dotted line position shown in Figure 4 into engagement with the stationary contact 60 of the cycle switch 45. The heater coil 40 will then be deenergized and a circuit will be completed through the temperature responsive switch 75 to the valve switch 47. The thermal element 11 will then start to cool and the spring 35 will return the crankshaft 12 and cam 44 to the dotted line position shown in Figure 1. The curve of the cooling cycle is indicated in Figure 5 by points B, C and D. During return travel of the cam 41, the lobe 46 will come into engagement with the roller 70 at point E on the cooling cycle or return stroke curve in Figure 5. The switch arm 66 and switch button 65 will then be depressed to move the switch arm 71 of the valve switch 47 into position to close an energizing circuit to the solenoid 49 of the valve 50. The valve 50 will then be actuated to supply water to the ice cube tray, as long as the roller 70 is riding on the lobe 46 of the cam 41 as indicated on the cooling cycle curve in Figure 5 from point "E" to point "F."

It has been found that for a given ambient temperature, the cooling portion of the curve from B to D will be substantially repeated for each heating and cooling operation of the thermal element, and the amount of time required for rotation of the cam 30 from the solid line position to the dotted line position in Figure 1 will be substantially the same for each operation. Thus, the cooling time of the thermal element may be used to control the time period that the valve 50 is open, to meter a predetermined volume of water to an ice cube tray or to any other device with which the heat motor may be associated. The position of the lobe 46 on the cam 41 may be varied if it is desired to open valve 50 during a different portion of the cooling cycle of the thermal element, and the length of the lobe 46 may be kept within safe limits to allow for variations in ambient temperature.

After the lobe 46 has moved beyond the roller 70, and the ice cube tray is filled as determined by the length of time that the lobe to hold the push button 65 of the switch 47 depressed between the points E, F on the graph shown in Figure 5, the thermally responsive switch 75 will be reset to open position by the higher temperature of the incoming water. At the end of the cooling cycle, the end 63 of the cam 44 will engage the actuating arm 51 and move said actuating arm to depress the push button 56 and move the switch arm 57 into position to energize the heater coil 40 when the ice cubes are again frozen and the thermal responsive switch 75 has closed.

Referring now in particular to Figure 6, illustrating a modified form in which my invention may be embodied, in this figure I have shown a cam 41a on one of the shafts 27. The cam 41a has a lobe 46a for operating a bellcrank 77, positioned to depress a plunger 79 of a metering valve 80 to mechanically operate said valve to effect a filling operation, as the cam 41a rotates in a clockwise direction and the lobe 46a of said cam moves into engagement with a roller 81 and pivots the bellcrank 77 in a direction to depress the plunger 79.

In this form of the invention, the roller 81 is carried on an arm 83 pivotally carried on a bracket 84 extending from an arm 85 of the bellcrank 77. The arm 83 has a stop 86 thereon engaged with the bracket 84 by a tension spring 87. The spring 87 is connected between the arm 83 and a lug 88 extending from the arm 85 of the bellcrank 77 toward the cam 41a.

Thus when the cam 41a is rotatably moving in a counterclockwise direction, the arm 83 will pivot with respect to the bracket 84 against the bias of the spring 87 and the bellcrank 77 will remain stationary. When, however, the cam 41a and lobe 46a are rotating in a clockwise direction, the stop 86 will bear against the bracket 84. As the lobe 46a engages the roller 81, the bellcrank 77 will be pivoted to depress the plunger 79 and open the valve 80.

It may be seen from the foregoing that in this form of my invention as in the form of my invention illustrated in Figures 1 through 4, when the cam 41a is rotated on the power stroke of the thermal element 11, the lobe 46a passes by the roller 81 and arm 83 and has no effect in opening the valve 80 or holding it open. Upon cooling of the thermal element, however, and the return stroke of the piston 13 and cam 41, engagement of the lobe 46 with the roller 81 will open the valve 80 and maintain said valve open for the length of time it takes the lobe 46a to pass roller 81, thus determining the open time of the valve 80 and effecting the metering of a measured volume of fluid to an ice cube tray or device being filled.

It should here be understood that while I have described the timer of my invention as being particularly adapted to meter a measured volume of water to an ice cube tray, the timer may be used for metering water for various other uses such as for automatic washing machines, dishwashers, dispensers for drinks and the like and for various other purposes where it is required that a vessel be filled with a measured volume of liquid.

It may further be understood that in such other uses, the crankshaft 27 may be used to drive other timer cams for controlling the electrical operations of the machine or to shift the clutches of the machine or perform like operations.

While I have herein shown and described several forms in which my invention may be embodied, it should be understood that I do not wish to be limited to the specific forms shown, and that various modifications and variations of the invention may be effected without departing from the spirit and scope of the novel concepts thereof.

I claim as my invention:

1. In a fluid metering device, a valve for controlling the flow of a fluid, electrically energizable means for opening and for closing said valve, a thermal element having a casing containing a fusible thermally expansible material and capable of transmitting heat from the thermally expansible material to the surrounding atmosphere and said thermal element having a power member extensibly movable with respect to said casing upon fusion of the thermally expansible material contained therein, electrically energizable heating means for heating said thermally expansible material, first switch means operated by said power member at the ends of extensible and retractable movement thereof for respectively deenergizing and energizing said electrically energizable heating means to effect cooling and heating of said thermal element, and second switch means operated by said power member only during its movement in the cooling cycle of the expansible material, said second switch means being moved to a first position for opening said valve at the beginning portion of the cooling cycle of said thermal element and moved to a second position at the end portion of the cooling cycle of said thermal element for closing said valve so that said valve will be held open for uniform time intervals to deliver equal quantities of fluid determined by the constant length of the cooling cycles of said thermal element and independent of the length of the heating cycle for constant fluid pressure conditions.

2. A fluid metering device, a valve for controlling the flow of a fluid, a thermal element having a casing containing a fusible thermally expansible material and capable of transmitting heat from the thermally expansible material to the surrounding atmosphere and said thermal element having a power member extensibly movable with respect to said casing upon fusion of the thermally expansible material contained therein, electrically energizable heating means for heating said thermally expansible material, switch means operated by said power member at the ends of extensible and retractable movement thereof for respectively deenergizing and energizing said electrically energizable heating means to effect cooling and heating of said thermal element, and a valve operator controlled by said power member, said operator moving said valve to open position at a predetermined point in the travel of said power member in a first portion of the cooling cycle and moving said valve to a closed position at a predetermined point in the travel of said power member in a later portion of the cooling cycle so that said valve will be open for uniform time intervals to deliver equal portions of fluid determined by the constant length of the cooling cycles of the thermal element and independent of the length of the heating cycle for constant fluid pressure conditions.

References Cited in the file of this patent

UNITED STATES PATENTS

| | | | |
|---|---|---|---|
| 1,468,179 | Sutton | Sept. 18, | 1923 |
| 1,795,013 | Denman | Mar. 3, | 1931 |
| 2,161,321 | Smith | June 6, | 1939 |
| 2,489,896 | Kempton | Nov. 29, | 1949 |
| 2,506,623 | Williams | May 9, | 1950 |
| 2,512,212 | Molotzak | June 20, | 1950 |
| 2,533,410 | Trad | Dec. 12, | 1950 |
| 2,552,962 | Hacker | May 15, | 1951 |
| 2,563,539 | Lindsay | Aug. 7, | 1951 |
| 2,625,996 | Trad | Jan. 20, | 1953 |
| 2,660,030 | Santos | Nov. 24, | 1953 |
| 2,710,146 | Drapeau | June 7, | 1955 |
| 2,797,546 | Reddi | July 2, | 1957 |
| 2,838,943 | Modes et al. | June 17, | 1958 |